United States Patent [19]

Johnson, Jr. et al.

[11] 4,169,791

[45] Oct. 2, 1979

[54] APPARATUS AND PROCESS FOR VOLUME REDUCTION OF AQUEOUS WASTE THROUGH SOLAR EVAPORATION

[75] Inventors: Victor R. Johnson, Jr., Cob County, Ga.; William O. Hagerman, Memphis, Tenn.

[73] Assignee: Waste Management, Inc., Oak Brook, Ill.

[21] Appl. No.: 939,933

[22] Filed: Sep. 6, 1978

[51] Int. Cl.² .............................................. B01D 1/24
[52] U.S. Cl. ..................................... 210/71; 210/170; 210/241; 126/415; 159/15
[58] Field of Search ................. 210/170, 63 R, 68, 71, 210/241, 180; 165/49; 159/15, 15 F; 202/234; 203/10, DIG. 11; 126/271; 4/172.12, 172.14; 137/236

[56] References Cited

U.S. PATENT DOCUMENTS

| 3,411,163 | 11/1968 | Myers, Jr. | 126/271 |
| 3,450,192 | 6/1969 | Hay | 165/49 |
| 3,653,150 | 4/1972 | Howard | 203/DIG. 1 |
| 4,055,473 | 10/1977 | Hay | 203/DIG. 1 |
| 4,103,368 | 8/1978 | Lockshaw | 126/271 |

FOREIGN PATENT DOCUMENTS

| 2611818 | 9/1977 | Fed. Rep. of Germany | 126/271 |
| 2633581 | 2/1978 | Fed. Rep. of Germany | 4/172.12 |

*Primary Examiner*—Benoît Castel
*Attorney, Agent, or Firm*—Sughrue, Rothwell, Mion, Zinn and Macpeak

[57] ABSTRACT

A lagoon containing aqueous waste to be volume reduced is provided with a cover having one or more segments, each of which is mounted upon a frame and is movable from a covering position to a position adjacent the lagoon. During fair weather, the cover is positioned adjacent the lagoon and liquid waste is pumped from the lagoon and dispersed over the surface of the cover. When inclement weather approaches, the pumping of the waste is ceased, the surface of the cover cleaned by flushing with clean water, and the cover moved into position over the lagoon to prevent precipitation from diluting the waste liquid. The invention is particularly useful in areas of low net evaporation rate.

17 Claims, 6 Drawing Figures

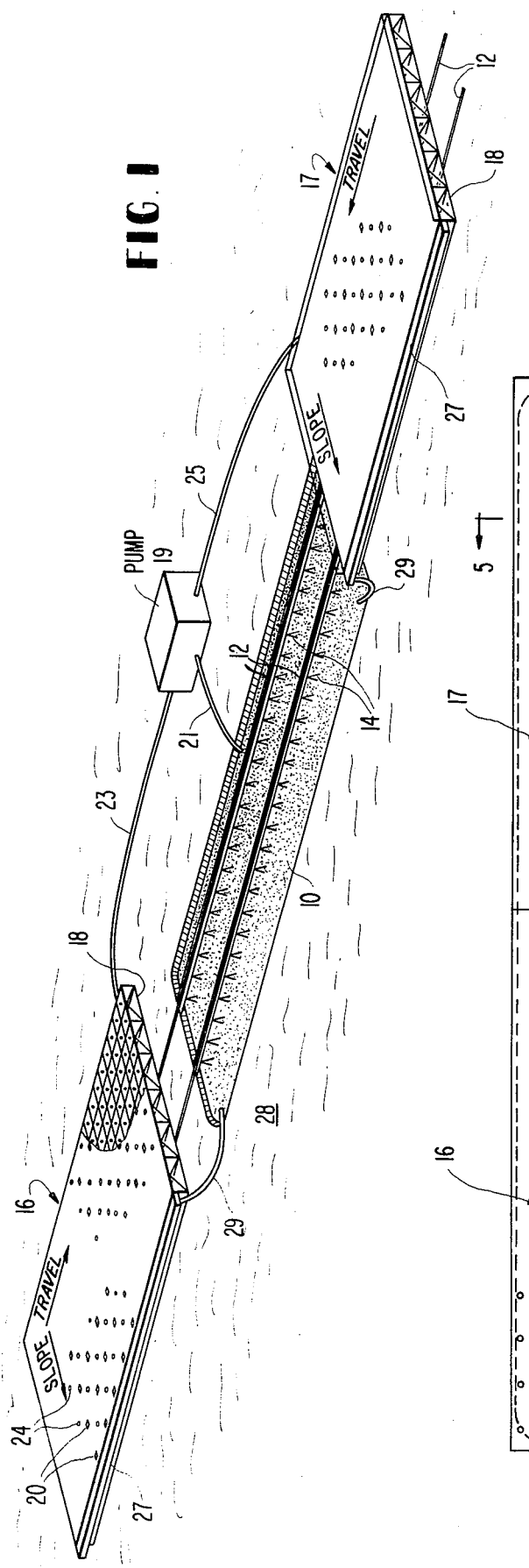
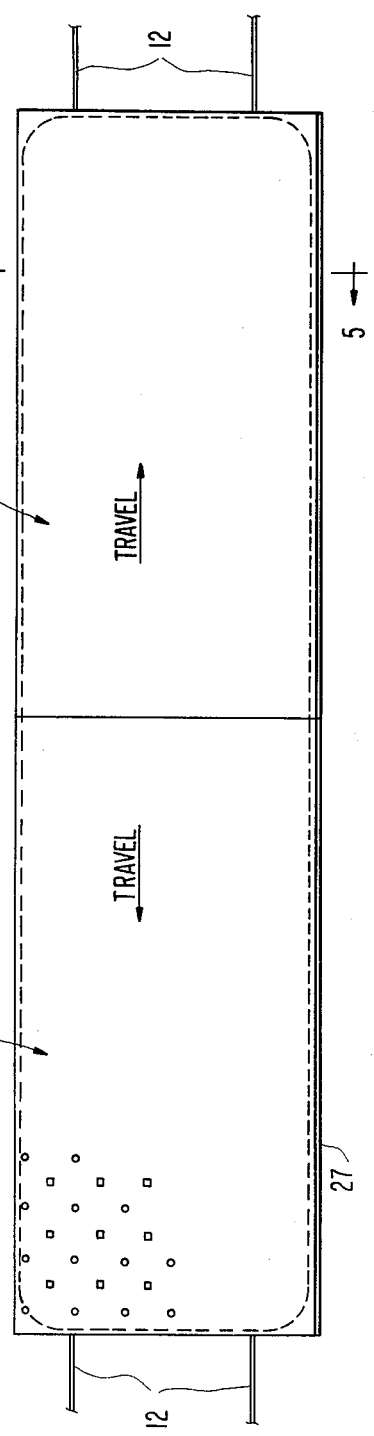
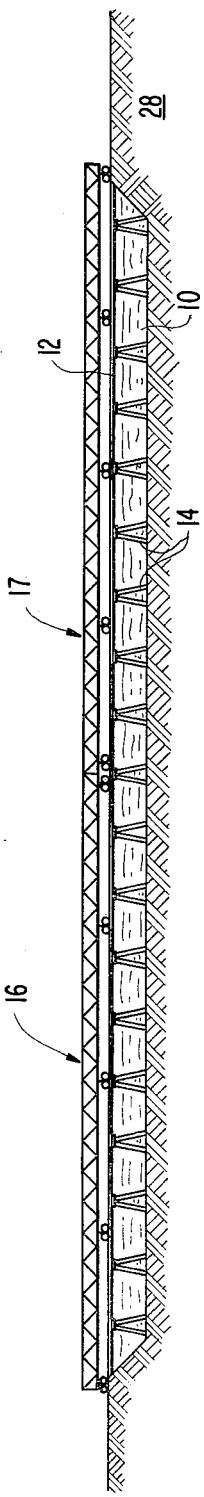

APPARATUS AND PROCESS FOR VOLUME REDUCTION OF AQUEOUS WASTE THROUGH SOLAR EVAPORATION

BACKGROUND OF THE INVENTION

1. Field of the Invention

The invention pertains to apparatus and a method for volume reduction of aqueous hazardous waste through solar evaporation particularly in areas having marginal or even negative annular net evaporation rates.

2. Description of the Prior Art

The greatest part of hazardous waste which must be disposed of in some fashion occurs in liquid or semi-liquid form. Traditionally, aqueous hazardous waste material has been treated and disposed of through one or a combination of: recycling or reclamation, incineration, water discharge of the aqueous portion after the pollutants have been removed or detoxified, and disposal on land where the untreated liquid is soaked or injected into the void spaces of soil and any solids are securely land-filled.

These treatment and disposal methods are extremely cost ineffective when dealing with high volumes of aqueous waste containing low concentrations of mixed pollutants, such as salts, heavy metals, and low vapor pressure organic materials. Recycling or reclamation works acceptably well only on high volumes of concentrated materials of uniform chemical constituency and, thus, high volumes of liquid with low concentrations of mixed pollutants can generally not be recovered by such methods. Incineration is not cost effective as large amounts of supplemental energy must be added to evaporate the water portion of the pollutants in order to oxidize the low vapor pressure organic materials and metals. The remaining metals and salts create potential air pollution and equipment damage problems. Removal or detoxification of pollutants prior to water discharge of the aqueous portion requires large initial capital expenditures and high operating cost for removal of the mixed pollutants. Additionally, the presence of salts and heavy metals excludes biological treatment of the organic portion as these pollutants in any significant concentration are biocides. Disposal of untreated liquid into soil by injection or soaking is generally cost ineffective as the difference between the natural soil moisture content and the maximum saturated moisture content without leachate generation is usually small and uniform mixing of the soil with the liquid is mechanically difficult to accomplish. Use of better absorbing mediums such as solid waste in place of soil may be cost effective, but such techniques may only be used in areas of high solid waste production. The potential of leachate generation if the material is over-saturated is nonetheless still present.

One solution to the treatment and disposal of high volumes of aqueous waste with low concentration of mixed pollutants such as salts, heavy metals, and low vapor pressure organics has been to evaporate off the water portion of the waste, leaving the pollutants in a concentrated form, thus making the four treatment methods mentioned above much more cost effective. However, use of fossil fuels to generate heat for evaporating the water phase is very cost ineffective as the cost of the fuel is more than the resulting treatment savings. For example, it would take 6,787,000 gallons of 18,500 BTU/lb. fuel oil to evaporate 100,000,000 gallons of 62° F. water at standard conditions assuming a 100% heat transfer efficiency, which is thermodynamically impossible.

Solar evaporation has been found to be a cost effective alternate volumetric reduction method in areas of high net evaporation rates and low land cost and impermeable soils. Desert areas are particularly well suited for such techniques. Many areas may have the low cost, impermeable land necessary for solar concentration of aqueous hazardous waste pollutants but, unfortunately, have a low or negative net annual evaporation rate caused by high rainfall and high humidity which has heretobefore prevented solar evaporation techniques from being successfully applied.

SUMMARY OF THE INVENTION

Accordingly, it is an object of the present invention to provide an apparatus and method for volumetric reduction of aqueous hazardous waste which are more cost effective than previous techniques.

Furthermore, it is an object of the present invention to provide such an apparatus and method which operates upon the principle of solar evaporation.

Moreover, it is a still further object of the present invention to provide such an apparatus and method for solar reduction which may be employed in areas of low or negative net evaporation rates.

These, as well as other objects of the invention, may be met by an apparatus for the volume reduction of aqueous waste comprising the combination of a lagoon for containing the waste to be reduced, at least a single cover for covering the lagoon which is laterally movable with respect to the surface of the lagoon, and means for supplying waste from the lagoon to the surface of the cover. The cover may be of unitary construction or may have two or more separable segments, the total area of which is at least as large as the area of the lagoon. A frame is provided for supporting each segment or section of the cover. The cover is adapted to cover the lagoon in a first position to prevent precipitation from reaching the lagoon and diluting the liquid waste. So that the cover may be laterally moved with respect to the lagoon, a plurality of wheels are connected to the frame and a track provided on which the wheels can run and the frame and cover consequently moved. To supply the waste liquid to the surface of the cover, a plurality of nozzles for dispersing waste on the outer surface of the cover are provided while a pump circulates the waste from the lagoon to the nozzles.

In a preferred embodiment, the frame which supports the cover is tilted at a small acute angle with respect to the surface of the liquid in the lagoon so that the excees unevaporated liquid waste will run off into a trough or gutter provided along the lower edge of the cover. The collected excess runoff is drained back into the lagoon. During the time the cover is positioned above the lagoon, rain water which is collected in the trough, is routed to an external normal drain to prevent dilution of the waste material contained in the lagoon.

Also in a preferred embodiment, the surface of the cover is cleansed before closing by flushing with clear water, thus preventing any accumulated solid waste on the cover from entering the external drain system. Flushing with water may also be done to remove concentrated solids from the surface of the cover when the lagoon and system are cleaned.

The invention may also be practiced by a method for volumetric reduction of aqueous waste material comprising the steps of covering a lagoon containing aqueous waste to be reduced with a cover which extends over the lagoon during periods of precipitation or inclement weather, moving the cover to a position adjacent the lagoon during periods of fair weather, and dispersing waste from the lagoon over the outer surface of the cover during the periods of fair weather. Runoff from the cover, either from precipitation or from excess liquid waste is collected and drained into the lagoon when the cover is open and into a normal external drain when the cover is closed and positioned over the lagoon. In a preferred embodiment, water is dispersed over the surface of the cover to flush accumulated solid waste from the cover before the cover is closed.

BRIEF DESCRIPTION OF THE DRAWINGS

FIG. 1 is a perspective view of an aqueous hazardous waste volume reduction system constructed in accordance with the invention.

FIG. 2 is an upper planar view of the system shown in FIG. 1 with the cover closed.

FIG. 3 is a cross-sectional view taken through FIG. 2.

DESCRIPTION OF THE PREFERRED EMBODIMENTS

Figure 4:
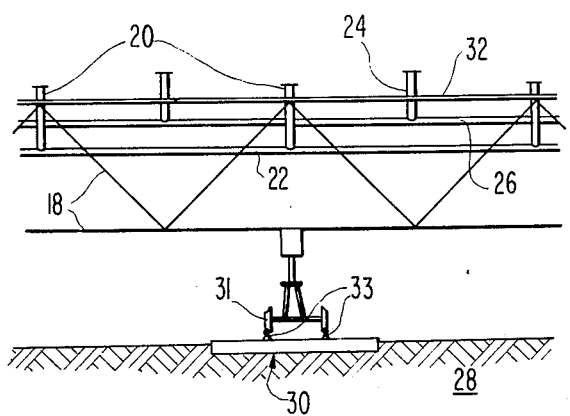
FIG. 4 is a cross-sectional view of a portion of FIG. 3 showing construction details.
Figure 5:
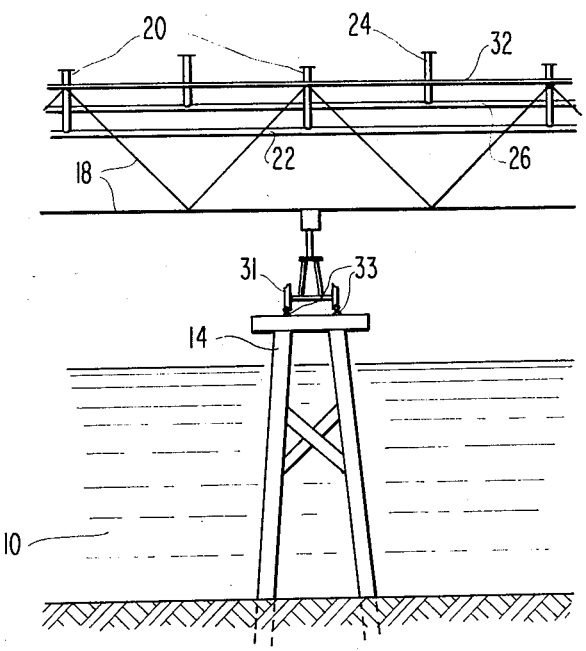
FIG. 5 is a cross-sectional view of a different portion of FIG. 3 showing construction details.
Figure 6:
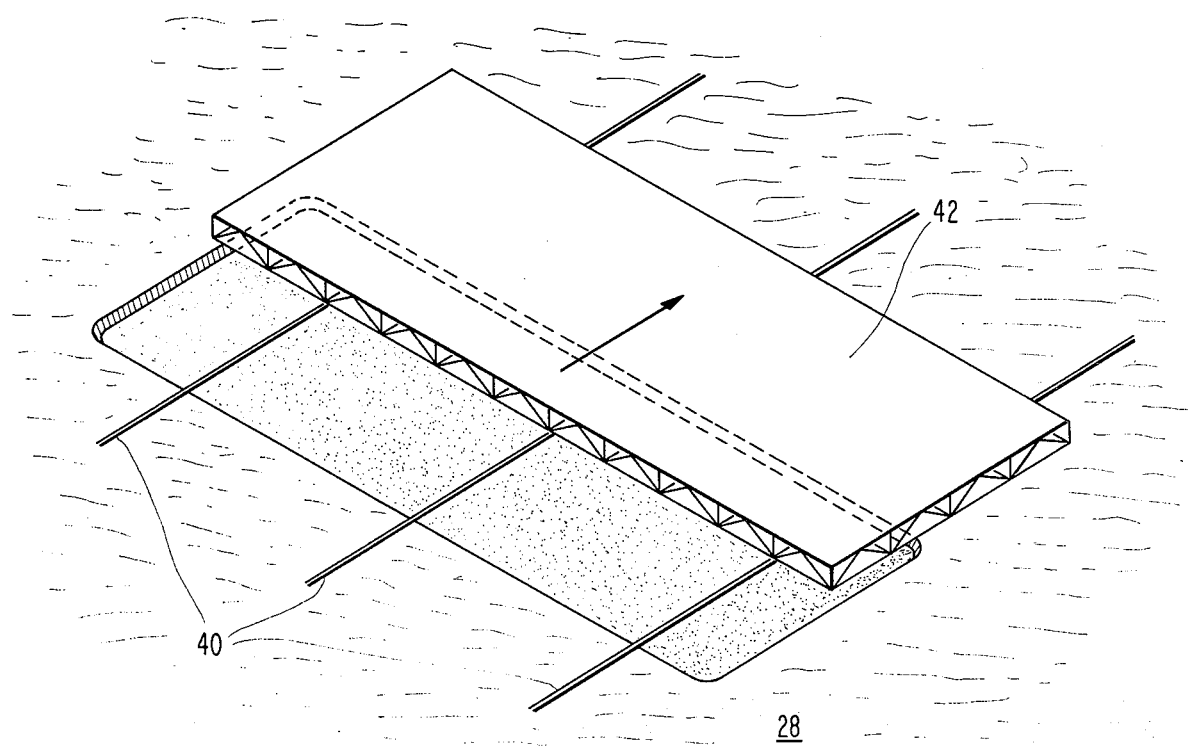
FIG. 6 is a perspective view showing an alternate embodiment of the invention.

Referring first to the perspective view of FIG. 1, there is shown an aqueous waste volume reduction system which is constructed in accordance with the teachings of the present invention. Lagoon 10, of size determined in accordance with the particular application, is preferably formed of impermeable soil but other fluid containing materials such as concrete surrounded by a concrete apron 28 and/or synthetic liners can be used with equal success.

A movable cover having two segments 16 and 17, shown here in the open position, is provided for selectively covering lagoon 10 to prevent precipitation from mixing with the liquid waste stored in lagoon 10. Each segment 16 and 17 includes a frame 18 which supports evaporating surface or deck 32. Each frame 18 is mounted upon track 12 which includes two rails, each of which is supported by trestles 14 positioned within lagoon 10 and cross-ties upon apron 28.

In fair weather, the cover is placed in the open position as shown here in FIG. 1. Upon each segment 16 and 17 of the cover are located at spaced locations nozzles 22 and 24. Pump 19 circulates liquid waste from lagoon 10 through inlet pipe 21 and through outlet pipes 23 and 25 to waste dispersal nozzles 20 which distribute the liquid waste pumped from lagoon 10 over the surface of deck 32. Waste dispersal nozzles 20 should be chosen to insure that the droplet particle size produced is sufficiently large that the liquid particles will not drift off deck 32 nor be blown away for the expected maximum expected wind speed. For pump pressures of approximately 30 psig, it is preferred that the droplet particle size be maintained above 100 microns.

A slight slope of deck 32 with respect to the plane of the liquid surface within lagoon 10 is maintained so that the waste distributed by nozzles 20 will run downhill and be collected in gutter 27 provided along the lower edge of deck 32. Drain hoses 29 connect the outlets of gutter 27 back to lagoon 10 so that the runoff waste is recirculated.

It will be readily appreciated that the evaporation rate with the system as provided in accordance with the present invention is substantially higher than it would be for a simple lagoon as the evaporation surface exposed to the sun's rays is at least doubled. By making deck 32 of even greater area, the evaporation rate may be increased still further.

At night or when inclement weather is approaching and precipitation is expected, cover segments 16 and 17 are closed to cover lagoon 10 to prevent rainfall from diluting the reduced aqueous waste. However, before closing, the surface of deck 32 is washed down by flushing with clean water provided through water nozzles 24 to remove the accumulated solid waste products from the surface of deck 32 and to wash them into lagoon 10. Water nozzles 24 are interspersed with waste dispersal nozzles 20 to insure complete cleansing.

When cover segments 16 and 17 are in the closed position as shown in the view of FIGS. 2 and 3, gutter outlet hoses 29 are removed from lagoon 10 and coupled to a normal external drain capable of handling the precipitation runoff. Alternatively, hoses 29 can simply be closed off and other hoses provided connecting gutters 27 to the drain.

As specifically shown in FIG. 3, cover segments 16 and 17 completely cover lagoon 10 vertically, but a space is left horizontally for air to circulate freely under cover segments 16 and 17 so that evaporation from lagoon 10 may still take place even during periods of precipitation.

A preferred construction of the cover and its supporting structure is shown in detail in FIGS. 4 and 5, where FIG. 4 is a cross-sectional view taken in the open state and FIG. 5 is a cross-sectional view taken in the closed state. Deck 32 is planar and can be constructed of plywood with a fiberglass or similar coating. Also, synthetic materials with an epoxy coating may be used as well. The coating selected must be chemically resistant to the type of hazardous waste being processed.

Deck 32 is supported by steel space frame 18, although other structural support systems may be used with equal success. Nozzles 20 and 24 extend through sealed apertures in deck 32 with nozzles 20 interconnected by pipe 22 which is, of course, coupled to pump 19 through pipe 23 or 25. Nozzles 24 are interconnected by pipe 26 and connected ultimately to an external water source of appropriate pressure. Pipes 22 and 26 may be secured to frame 18 using standard clamps.

Wheels 31 are coupled to frame 18 through an appropriate supporting structure. Wheels 31 ride on rails 33 which form half of track 12. Here, a double-rail construction is shown, although other track constructions may be used as well. On concrete apron 28, rails 33 rest upon cross-ties 30, while above lagoon 10 rails 33 are supported by trestles 14. In other embodiments of the invention, frame 18 can be supported from above or from along the edges of lagoon 10.

An alternative embodiment is shown in perspective view in FIG. 6. Here, only a single cover segment 42 is employed, this segment by itself having a larger area than lagoon 10. A track structure 40 having three rails permits translational movement of cover 42 relative to lagoon 10. In all other respects, the embodiment shown in FIG. 6 operates in the same manner as that shown in the previous figures. In general, any number of cover segments may be used so long as they may be joined together to substantially cover vertically the surface of lagoon 10.

This completes the description of the preferred embodiments of the invention. Although preferred embodiments have been described, it is believed that numerous alterations and modifications thereto would be apparent to one having ordinary skill in the art without departing from the spirit and scope of the invention.

What is claimed is:

1. Apparatus for the volume reduction of aqueous waste through solar evaporation comprising in combination:
    a lagoon for containing waste to be reduced;
    at least one cover for covering said lagoon, said cover being laterally movable with respect to the surface of said lagoon; and
    means for supplying waste from said lagoon to the upper surface of said cover, said waste supplying means including a plurality of nozzles coupled to said cover and positioned for dispersing said waste upon said upper surface of said cover, and means including conduit means and pump means for supplying said waste from said lagoon to said nozzles, the waste dispersed upon said upper surface of said cover being exposed to the atmosphere to evaporate off at least some of the water portion of said aqueous waste through solar evaporation thereby concentrating pollutants in said waste.

2. The combination of claim 1 wherein the surface area of said cover is at least as large as that of said lagoon.

3. The combination of claim 1 wherein said cover has a plurality of separable sections.

4. The combination of claim 1 further comprising:
    second conduit means for returning unevaporated waste from said upper surface to said lagoon.

5. Apparatus for the volume reduction of aqueous waste through solar evaporation comprising in combination:
    a lagoon for containing waste to be reduced;
    at least one movable cover, said cover being adapted to cover said lagoon in a first position and to be positioned adjacent said lagoon in a second position;
    means for supporting said cover; and
    means for supplying waste from said lagoon to the upper surface of said cover when said cover is in said second position, said waste supplying means including a plurality of nozzles coupled to said cover and positioned for dispersing said waste upon said upper surface, said nozzles being attached to said supporting means and being movable therewith, pump means, conduit means for coupling the inlet of said pump to said lagoon and the outlet of said pump to said nozzles, the waste dispersed upon said upper surface of said cover being exposed to the atmosphere to evaporate off at least some of the water portion of said aqueous waste through solar evaporation thereby concentrating pollutants in said waste.

6. The combination of claim 5 further comprising means for laterally moving said frame and cover.

7. The combination of claim 6 wherein said means for laterally moving said cover comprises:
    a plurality of wheels connected to said frame; and
    a track, said wheels being positioned on said track.

8. The combination of claim 5 further comprising:
    second conduit means for returning unevaporated waste from said upper surface to said lagoon.

9. Apparatus for the volume reduction of aqueous waste through solar evaporation comprising in combination:
    a lagoon for containing waste to be reduced;
    a cover having at least one segment;
    a frame for each segment of said cover, said frame supporting said cover at an acute angle with respect to the liquid surface in said lagoon;
    a plurality of wheels connected to each segment;
    a track, said wheels being positioned on and running on said tract, said track extending and being positioned so that said cover can be positioned to fully cover vertically said liquid surface and alternatively can be positioned to expose vertically at least a portion of said liquid surface to the atmosphere; and
    means for supplying waste from said lagoon to the upper surface of said cover, said waste supplying means including a plurality of nozzles coupled to said cover and positioned for dispersing said waste upon said upper surface, said nozzles being attached to said supporting means and being movable therewith, pump means, conduit means for coupling the inlet of said pump to said lagoon and the outlet of said pump to said nozzles, the waste dispersed upon said upper surface of said cover being exposed to the atmosphere to evaporate off at least some of the water portion of said aqueous waste through solar evaporation thereby concentrating pollutants in said waste.

10. The combination of claim 9 further comprising: means for dispersing water over said outer surface of said cover.

11. The combination of claims 9 or 10 further comprising a trough positioned along the lower edge of said cover for collecting liquid runoff from said surface, said trough draining into said lagoon where said cover is positioned to cover said lagoon and otherwise into external drain means.

12. The combination of claim 9 wherein said track comprises:
    a plurality of rails; and
    a plurality of support means for said rails.

13. A method for volume reduction of aqueous waste comprising the steps of:
    covering a lagoon containing aqueous waste of which the volume is to be reduced with a cover extending over said lagoon during periods of precipitation, said cover being laterally movable with respect to the surface of said lagoon;
    moving said cover to a position adjacent said lagoon during periods of fair weather;
    dispersing waste from said lagoon over the upper surface of said cover during said periods of fair weather, said waste dispersed from said lagoon being exposed to the atmosphere upon said upper surface, said waste being dispersed through a plurality of nozzles coupled to said cover and positioned for dispersing said waste upon said upper surface of said cover; and
    evaporating off at least some of the water portion of said aqueous waste through solar evaporation thereby concentrating pollutants in said waste.

14. The method of claim 13 further comprising the step of collecting the runoff from said cover.

15. The method of claim 14 further comprising the step of draining the collected runoff from said cover into said lagoon when said cover is positioned adjacent said lagoon.

16. The method of claim 14 further comprising the step of draining the collected runoff from said cover into external drain means when said cover is positioned over said lagoon.

17. The method of claim 13 further comprising the step of dispersing water over said surface to said cover to clean said surface before moving said cover from said position adjacent said lagoon to a position covering said lagoon.

* * * * *